(12) United States Patent
Lesso et al.

(10) Patent No.: US 11,735,191 B2
(45) Date of Patent: Aug. 22, 2023

(54) SPEAKER RECOGNITION WITH ASSESSMENT OF AUDIO FRAME CONTRIBUTION

(71) Applicant: Cirrus Logic International Semiconductor Ltd., Edinburgh (GB)

(72) Inventors: John Paul Lesso, Edinburgh (GB); John Laurence Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 394 days.

(21) Appl. No.: 16/451,517

(22) Filed: Jun. 25, 2019

(65) Prior Publication Data

US 2019/0318745 A1 Oct. 17, 2019

Related U.S. Application Data

(63) Continuation of application No. 15/666,280, filed on Aug. 1, 2017, now Pat. No. 10,726,849.

(Continued)

(30) Foreign Application Priority Data

Dec. 23, 2016 (GB) .................... 1622191

(51) Int. Cl.
*G10L 17/02* (2013.01)
*G10L 17/04* (2013.01)
(Continued)

(52) U.S. Cl.
CPC .............. *G10L 17/20* (2013.01); *G10L 17/02* (2013.01); *G10L 17/04* (2013.01); *G10L 17/22* (2013.01);
(Continued)

(58) Field of Classification Search
CPC ......... G10L 15/20; G10L 17/02; G10L 17/04; G10L 17/20; G10L 25/15; G10L 25/18; G10L 25/20
See application file for complete search history.

(56) References Cited

U.S. PATENT DOCUMENTS 4,591,668 A 5/1986 Iwata
4,829,572 A * 5/1989 Kong .................. G10L 15/00
704/254

(Continued)

FOREIGN PATENT DOCUMENTS

CN 1758332 A 4/2006
CN 102486922 A 6/2012
(Continued)

OTHER PUBLICATIONS

International Search Report and Written Opinion of the International Searching Authority, International Application No. PCT/GB017/052233, dated Dec. 7, 2017.
(Continued)

*Primary Examiner* — Bhavesh M Mehta
*Assistant Examiner* — Oluwadamilola M Ogunbiyi
(74) *Attorney, Agent, or Firm* — Jackson Walker L.L.P.

(57) ABSTRACT

This application describes methods and apparatus for speaker recognition. An apparatus according to an embodiment has an analyzer for analyzing each frame of a sequence of frames of audio data which correspond to speech sounds uttered by a user to determine at least one characteristic of the speech sound of that frame. An assessment module determines, for each frame of audio data, a contribution indicator of the extent to which that frame of audio data should be used for speaker recognition processing based on the determined characteristic of the speech sound. Said contribution indicator comprises a weighting to be applied to each frame in the speaker recognition processing. In this
(Continued)

way frames which correspond to speech sounds that are of most use for speaker discrimination may be emphasized and/or frames which correspond to speech sounds that are of least use for speaker discrimination may be de-emphasized.

26 Claims, 4 Drawing Sheets

Related U.S. Application Data

(60) Provisional application No. 62/370,408, filed on Aug. 3, 2016.

(51) Int. Cl.
| | | |
|---|---|---|
| *G10L 17/20* | (2013.01) | |
| *G10L 17/22* | (2013.01) | |
| *G10L 25/15* | (2013.01) | |
| *G10L 25/84* | (2013.01) | |
| *G10L 25/90* | (2013.01) | |

(52) U.S. Cl.
CPC .............. *G10L 25/15* (2013.01); *G10L 25/84* (2013.01); *G10L 25/90* (2013.01)

(56) References Cited

U.S. PATENT DOCUMENTS

| | | | | |
|---|---|---|---|---|
| 4,937,871 | A | | 6/1990 | Hattori |
| 5,271,088 | A | * | 12/1993 | Bahler .................... G10L 17/06 704/E17.007 |
| 5,522,012 | A | * | 5/1996 | Mammone .............. G10L 17/02 704/250 |
| 5,737,485 | A | | 4/1998 | Flanagan et al. |
| 5,933,807 | A | * | 8/1999 | Fukuzawa ................ G10L 15/22 704/E15.04 |
| 5,946,654 | A | * | 8/1999 | Newman ................. G10L 17/04 704/250 |
| 6,253,179 | B1 | * | 6/2001 | Beigi ....................... G10L 17/20 704/243 |
| 6,256,609 | B1 | * | 7/2001 | Byrnes .................... G10L 19/02 704/219 |
| 6,463,412 | B1 | * | 10/2002 | Baumgartner .......... G10L 15/26 704/E15.045 |
| 6,804,350 | B1 | * | 10/2004 | Siqueira ................ H04M 9/082 379/406.01 |
| 8,005,675 | B2 | | 8/2011 | Wasserblat et al. |
| 8,024,196 | B1 | | 9/2011 | Wodtke et al. |
| 8,812,319 | B2 | | 8/2014 | Skerpac |
| 8,831,942 | B1 | * | 9/2014 | Nucci ..................... G10L 25/90 704/250 |
| 2002/0095295 | A1 | | 7/2002 | Cohen et al. |
| 2004/0107098 | A1 | * | 6/2004 | Deligne .................. G10L 15/20 704/E15.041 |
| 2004/0236573 | A1 | * | 11/2004 | Sapeluk ................... G10L 17/02 704/224 |
| 2005/0021335 | A1 | * | 1/2005 | Chaudhari ............ G10L 15/065 704/E15.009 |
| 2005/0060153 | A1 | * | 3/2005 | Gable ..................... G10L 17/02 704/E17.005 |
| 2005/0096906 | A1 | | 5/2005 | Barzilay et al. |
| 2006/0053009 | A1 | | 3/2006 | Jeong et al. |
| 2006/0116877 | A1 | | 6/2006 | Pickering et al. |
| 2006/0229875 | A1 | | 10/2006 | Acero et al. |
| 2008/0300871 | A1 | | 12/2008 | Gilbert |
| 2009/0063146 | A1 | * | 3/2009 | Yoshioka ................ G10L 17/26 704/250 |
| 2009/0122198 | A1 | * | 5/2009 | Thorn ..................... G06V 40/16 348/E9.037 |
| 2009/0192788 | A1 | * | 7/2009 | Yoshioka ................ G10L 25/78 704/206 |
| 2009/0204390 | A1 | * | 8/2009 | Yamamoto ............ G10L 15/065 704/8 |
| 2010/0082341 | A1 | * | 4/2010 | Kim ........................ G10L 17/02 704/E17.001 |
| 2010/0223056 | A1 | * | 9/2010 | Kadirkamanathan ... G10L 13/08 704/E15.005 |
| 2011/0202345 | A1 | | 8/2011 | Meyer et al. |
| 2011/0276323 | A1 | * | 11/2011 | Seyfetdinov ............ G10L 25/78 704/E21.001 |
| 2012/0014567 | A1 | * | 1/2012 | Allegra ................... G06V 40/70 704/E15.001 |
| 2012/0232899 | A1 | * | 9/2012 | Koval ..................... G10L 17/02 704/E15.001 |
| 2012/0232901 | A1 | * | 9/2012 | Kadirkamanathan ...................... G10L 15/187 704/E15.005 |
| 2013/0054234 | A1 | * | 2/2013 | Kim ..................... G10L 21/0208 704/226 |
| 2013/0132091 | A1 | * | 5/2013 | Skerpac .................. G10L 17/00 704/273 |
| 2013/0300648 | A1 | * | 11/2013 | Kim ........................ G04G 21/00 345/156 |
| 2013/0332165 | A1 | * | 12/2013 | Beckley .................. G10L 15/20 704/246 |
| 2014/0064514 | A1 | | 3/2014 | Mikami et al. |
| 2014/0195236 | A1 | * | 7/2014 | Hosom ................... G06N 3/082 704/249 |
| 2014/0270216 | A1 | * | 9/2014 | Tsilfidis ................ H04M 9/082 381/66 |
| 2014/0278391 | A1 | | 9/2014 | Braho et al. |
| 2014/0324428 | A1 | | 10/2014 | Farraro |
| 2015/0106088 | A1 | * | 4/2015 | Jarvinen ............. G10L 21/0208 704/233 |
| 2015/0255060 | A1 | * | 9/2015 | Tomita .................... G10L 15/02 704/254 |
| 2015/0262577 | A1 | * | 9/2015 | Nomura .................. G10L 15/22 704/231 |
| 2015/0371639 | A1 | | 12/2015 | Foerster et al. |
| 2016/0189707 | A1 | * | 6/2016 | Donjon ................... G10L 15/02 704/228 |
| 2016/0284345 | A1 | * | 9/2016 | Ji ........................... G06F 16/638 |
| 2016/0334911 | A1 | * | 11/2016 | Kimura .................. G06F 3/0412 |
| 2017/0061968 | A1 | * | 3/2017 | Dalmasso ............... G10L 17/08 |
| 2017/0085985 | A1 | * | 3/2017 | Kim ........................ H04R 3/005 |
| 2017/0094049 | A1 | * | 3/2017 | Kanevsky ............... G06F 21/32 |
| 2017/0133041 | A1 | * | 5/2017 | Mortensen ............. G10L 15/02 |
| 2017/0286407 | A1 | * | 10/2017 | Chochowski ........... G10L 15/26 |
| 2017/0294184 | A1 | * | 10/2017 | Bradley .................. G10L 25/18 |
| 2017/0372725 | A1 | * | 12/2017 | Khoury ................... G10L 25/45 |
| 2018/0012602 | A1 | * | 1/2018 | Komissarchik ......... G10L 17/02 |
| 2018/0204111 | A1 | * | 7/2018 | Zadeh .................. G06N 3/0436 |
| 2019/0013013 | A1 | * | 1/2019 | McLaren .............. G10L 15/063 |
| 2019/0080697 | A1 | * | 3/2019 | Grancharov ............ G10L 17/02 |

FOREIGN PATENT DOCUMENTS

| | | | |
|---|---|---|---|
| EP | 3154055 | A2 | 4/2017 |
| JP | 2543528 | B2 * | 10/1996 |
| WO | WO-9638836 | A1 * | 12/1996 .......... G10L 19/022 |
| WO | 200116940 | A1 | 3/2001 |
| WO | 2015012680 | A2 | 1/2015 |
| WO | WO-2017157423 | A1 * | 9/2017 .......... G10L 19/022 |

OTHER PUBLICATIONS

Zhao, Yali et al., "Dual-microphone based binary mask estimation for robust speaker verification", 2012 International Conference on Audio, Language and Image Processing (ICALIP), Jul. 16, 2012, pp. 1014-1019.

Leung, K.Y. et al., Adaptive articulatory feature-based conditional pronunciation modeling for speaker verification, Speech Communication, Elsevier Science Publishers, Amsterdam, NL, vol. 48, No. 1, Jan. 1, 2006, pp. 71-84.

Besacier, L. et al., "Frame pruning for automatic speaker identification", 9th European Signal Processing Conference (EUSIPCO 1998), IEEE, Sep. 8, 1998, pp. 1-4.

Combined Search and Examination Report under Sections 17 and 18(3), UKIPO, Application No. GB1622198.8, dated Jun. 6, 2017.

(56) References Cited

OTHER PUBLICATIONS

Combined Search and Examination Report under Sections 17 and 18(3), UKIPO, Application No. GB1622191.3, dated Jun. 26, 2017.
Search Report under Section 17, UKIPO, Application No. GB1622198.8, dated Dec. 18, 2017.
International Search Report and Written Opinion of the International Searching Authority, International Application No. PCT/GB017/052234, dated Dec. 8, 2017.
First Office Action, China National Intellectual Property Administration, Application No. 2017800471904, dated Oct. 17, 2022.

\* cited by examiner

SPEAKER RECOGNITION WITH ASSESSMENT OF AUDIO FRAME CONTRIBUTION

REFERENCE TO PREVIOUSLY FILED APPLICATIONS

This application is a continuation of U.S. Non-Provisional patent application Ser. No. 15/666,280, filed Aug. 1, 2017, which claims benefit of U.S. Provisional Patent Application Ser. No. 62/370,408, filed Aug. 3, 2016, and United Kingdom Patent Application No. 1622191.3, filed Dec. 23, 2016, all which are incorporated by reference herein in their entirety.

FIELD

The field of representative embodiments of this disclosure relates to methods, apparatuses, or implementations concerning or relating to biometric speaker recognition. Applications include, but are not limited to, those concerning speaker enrolment or verification, especially in the presence of environmental effects such as background noise.

BACKGROUND

Voice user interfaces are provided to allow a user to interact with a system using their voice. One advantage of this interface, for example in devices such as smartphones, tablet computers and the like, is that it allows the user to operate at least some aspects of the device in a hands-free manner. Speech recognition techniques, i.e. techniques to extract the words spoken from the voice audio signal, may, for example, be used to detect that a particular trigger phrase has been spoken to set the device to expect a spoken command and to recognize a command when spoken and to perform operations in response. For example, if the spoken command asks for publicly available information, then the interface may cause a query to be submitted to an internet search engine in order to be able to supply that information to the user.

However, in other cases, some level of authentication may be desirable to verify the identity of the user before acting on any command, for example if the spoken command relates to personal information, or requests some financial transaction.

To maintain the generally hands-free mode of user interaction, the voice user interface may comprise some form of speaker recognition, i.e. some analysis of the voice audio input signal to extract characteristics of that signal distinctive to one of one or more users. The identity of the user may thus be verified with a high level of confidence with more security than passwords and more conveniently than other biometric verification methods such as fingerprint or iris patterns.

The accuracy of this user verification may be characterized in terms of a false acceptance rate (FAR) and a false rejection rate (FRR). The FAR quantifies the probability that a different user may be falsely authenticated as an authorized user, with obvious financial security and privacy risks to the proper user. The FRR quantifies the probability that a valid user may be rejected, which causes inconvenience to the user, who may then have to repeat his attempt or use some other form of authentication.

The speaker recognition process may rely on comparing spectral characteristics of the current speech samples with those of previously enrolled speech samples. However any background noise during authentication attempts may be superimposed on the speaker's voice and may hide or alter spectral features and thus give errors in the comparison. Background noise during enrollment may conversely add features that are absent when authenticating in a quiet environment. These effects may degrade the FAR or FRR, with the undesirable security or user inconvenience consequences described above.

Attempts to mitigate the problem using signal processing to try and remove the noise added to the signal may affect the spectral characteristics of the resultant compensated speech and thus again degrade the accuracy.

According to an embodiment there is provided an apparatus for use in biometric speaker recognition, comprising:
an analyzer for analyzing each frame of a sequence of frames of audio data which correspond to speech sounds uttered by a user to determine at least one characteristic of the speech sound of that frame; and
an assessment module for determining for each frame of audio data a contribution indicator of the extent to which that frame of audio data should be used for speaker recognition processing based on the determined at least one characteristic of the speech sound, wherein said contribution indicator comprises a weighting to be applied to the each frame in the speaker recognition processing.

In some embodiments the apparatus may comprise a speaker recognition module configured to apply speaker recognition processing to the frames of audio data, wherein the speaker recognition module is configured to process the frames of audio data according to the contribution indicator for each frame.

In some instances the contribution indicator may comprise a selection of frames of audio data not to be used in the speaker recognition processing.

The speaker recognition processing may comprise processing the frames of audio data for speaker enrollment. The speaker recognition processing may comprise processing the frames of audio data for speaker verification. The speaker recognition processing may comprise processing the frames of audio data for generation of a generalized model of a population of speakers.

The at least one characteristic of the speech sound may comprise identification of the speech sound as one of a plurality of predefined classes of phonemes. The at least one characteristic of the speech sound may comprise identification of the speech sound as a specific phoneme. The contribution indicator for a phoneme or class of phonemes may vary based on the number of previous instances of the same phoneme or class of phoneme in previous frames of audio data.

The at least one characteristic of the speech sound may comprise at least one characteristic of one or more formants in the speech sound. The characteristic may comprise an indication of at least one formant peak and/or an indication of at least one formant null.

The assessment module may be configured to receive an indication of acoustic environment in which the speech sound was uttered by the user. The contribution indicator may also be based on the indication of acoustic environment. The indication of acoustic environment may comprise an indication of noise in the audio data. The indication of noise may comprise an indication of at least one of: noise amplitude level; noise frequency and/or spectrum; noise level relative to signal level for sounds vocalised by the user.

In some embodiments the at least one characteristic of the speech sound comprises identification of the speech sound as one of a plurality of predefined categories of phonemes and for at least one of the predefined categories of phonemes, the assessment modules applies a transfer function between a value of contribution indicator and noise level.

The analyzer may be configured to analyze the audio data to determine said indication of noise. The analyzer may be configured to identify frames of the audio signal that do not correspond to sounds vocalised by the user to determine the indication of noise from such frames.

In some embodiments the assessment module is configured such that if the indication of noise is above a first threshold level, then the assessment module indicates that no frames of audio data should be used for speaker recognition processing.

In some embodiments the indication of acoustic environment comprises an indication of reverberation in the audio data. The analyzer may be confirmed to analyze the audio data to determine the indication of reverberation.

In some embodiments the assessment module is configured to receive an indication of a parameter of an acoustic channel for generating the audio data and the contribution indicator is also based on said indication of the parameter of the acoustic channel. The indication of a parameter of the acoustic channel may comprise an indication of a parameter of a microphone used to receive the speech sound uttered by a user. The parameter of a microphone may comprise a microphone resonance. The indication of a parameter of the acoustic channel may comprise an indication of bandwidth of the audio channel.

In some embodiments the assessment module is configured to receive an indication of a speech characteristic derived from speech sounds previously uttered by the user and the contribution indicator is also based on the indication of the speech characteristic. The indication of the speech characteristic may comprise an indication of a pitch of the user and/or an indication of a nasality of the user.

In some embodiments the assessment module is configured to receive an indication of at least one enrolled user profile and the contribution indicator is also based on said indication of the enrolled user profile. The indication of at least one enrolled user profile may comprise an indication of a user profile most relevant for the speaker recognition processing. The indication of a user profile most relevant for the speaker recognition processing may be derived from the speaker recognition processing.

In some embodiments the assessment module is configured such that the contribution indicator for a frame of audio data is based on the determined at least one characteristic of the speech sound and on the number of previous frames of audio data where the determined at least one characteristic was similar.

The speaker recognition module may be operable in a verification mode to process said frames of audio data to determine one or more features of speech sounds of said frames of data and to compare said one or more features with at least one user model for an enrolled user to determine a confidence level indicative of whether or not the current speaker is that enrolled user. The speaker recognition module may be configured to determine, for a plurality of frames of the audio data, a frame confidence score indicative of a degree of matching between that frame of audio data and the at least one user model and combine a plurality of frame confidence scores to determine the confidence level wherein the combination of frame confidence scores is based on the contribution indicators for the relevant frames. The speaker recognition module may be operable to not process some frames of data to generate a frame confidence score and/or omit the frame confidence score for at least some frames of audio data from combination to form the confidence level based on the contribution indicator for said frames of audio data. Additionally or alternatively the speaker recognition module may be operable to apply a weighting to at least some of the frame confidence scores based on the contribution indicator for said frames of audio data.

The speaker recognition module may be operable in an enrolment mode to process said audio signal to form a user model for an enrolling user. The speaker recognition module may be operable to not process some frames of data to form said user based on the contribution indicator for said frames of audio data.

The apparatus may further comprise a speech recognition module configured to analyze said frames of audio data.

The apparatus may have a microphone for generating an audio signal corresponding to speech sounds uttered by the user.

The apparatus may be implemented as an integrated circuit.

Embodiments also relate to electronic devices comprising an apparatus as described by any of the variants outlined above. The electronic device may be at least one of: a portable device; a communication device; a mobile telephone; a computing device; a laptop, notebook or tablet computer; a gaming device; a wearable device; a voice controllable device; an identity verification device; a wearable device; or a domestic appliance.

Embodiments also relate to apparatus for use in biometric speaker recognition comprising:

an assessment module for determining for a sequence of frames of audio data which correspond to speech sounds uttered by a user a contribution indicator of the extent to which a frame of audio data should be used for speaker recognition processing based on at least one characteristic of the speech sound to which the frame relates, wherein said contribution indicator comprises a weighting to be applied to the each frame in the speaker recognition processing.

Embodiments also relate to a method of speaker recognition, comprising:

analyzing each frame of a sequence of frames of audio data which correspond to speech sounds uttered by a user to determine at least one characteristic of the speech sound of that frame; and determining for the each frame of audio data a contribution indicator of the extent to which the each frame of audio data should be used for speaker recognition processing based on the determined at least one characteristic of the speech sound, wherein said contribution indicator comprises a weighting to be applied to the each frame in the speaker recognition processing.

Embodiments also relate to a non-transitory computer-readable storage medium having machine readable instructions stored thereon that when executed by a processor, cause the processor to perform the method as described. Aspects also relate to an apparatus comprising a processor and such a non-transitory computer-readable storage medium.

BRIEF DESCRIPTION OF THE FIGURES

To better explain the principles and advantages of various embodiments, examples will now be described with respect to the accompanying drawings, of which.

EXAMPLE EMBODIMENTS OF THE PRESENT DISCLOSURE

Figure 1A:
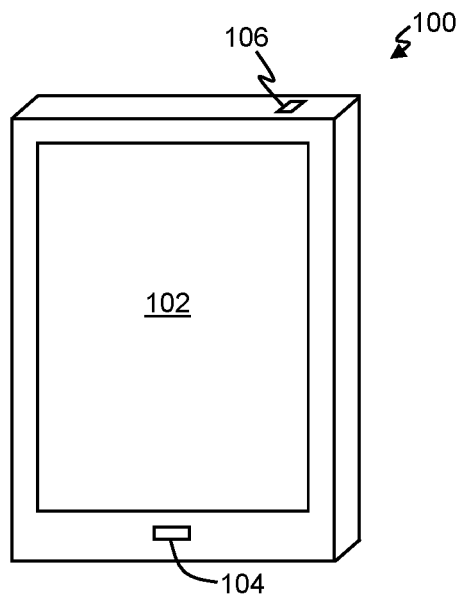
FIGS. 1a and 1b illustrate an electronic device capable of voice control.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments relate to methods and apparatus for use in biometric speaker recognition, i.e. speaker recognition based on analysis of audio signals corresponding to speech sounds, i.e. utterances, of a user.

For clarity as used in this description, the term "speaker recognition" at least refers to providing information about the identity of a person speaking. For example, speaker recognition may determine the identity of a speaker, from amongst a group of previously registered individuals. For instance if Alice and Barbara are both registered users, the speaker recognition may determine whether the current user speaking is Alice or is Barbara. Speaker recognition may also determine the current speaker is most likely not a member of the group of previously registered individuals, for instance maybe a malfeasor or maybe just an innocent bystander whose voice has been captured unintentionally. In some implementations, speaker recognition may provide information indicating whether a speaker is or is not a particular individual, for example for the purposes of identification and/or authentication, e.g. if Alice is a registered voice user of the device, the speaker recognition may confirm or verify whether or not the current user is indeed Alice. In such speaker recognition implementations, it is usual for one or more users to provide voice samples as part of an enrollment process which can be processed so as to derive characteristics about the user which can be used later as part of identification and/or verification. At least some speaker recognition implementations may also make use of a generalised speaker model based on characteristics of the population at large, e.g. derived from voice samples from a representative corpus of speakers, such as a Universal Background Model (UBM). The term speaker recognition processing at least refers to processing audio data for speaker recognition purposes which shall include identification and/or verification as well as any enrollment or registration and/or generation of a suitable generalized speaker model such as UBM.

As used in this description, the term speaker recognition is distinct from the term "speech recognition". Speech recognition, as used herein, at least refers to determining the content and/or the meaning of what is spoken, rather than recognizing the person speaking. It will be understood that it would be possible to implement speech recognition without speaker recognition, for example if the identity of a user was not important or was to be established when required in some other way. There may be some implementations where speaker recognition is required, e.g. for biometric verification of identity, but speech recognition is not required. In at least some implementations, however, a system may be selectively operable to provide both speaker recognition and speech recognition, either simultaneously or individually as required.

Figure 1B:
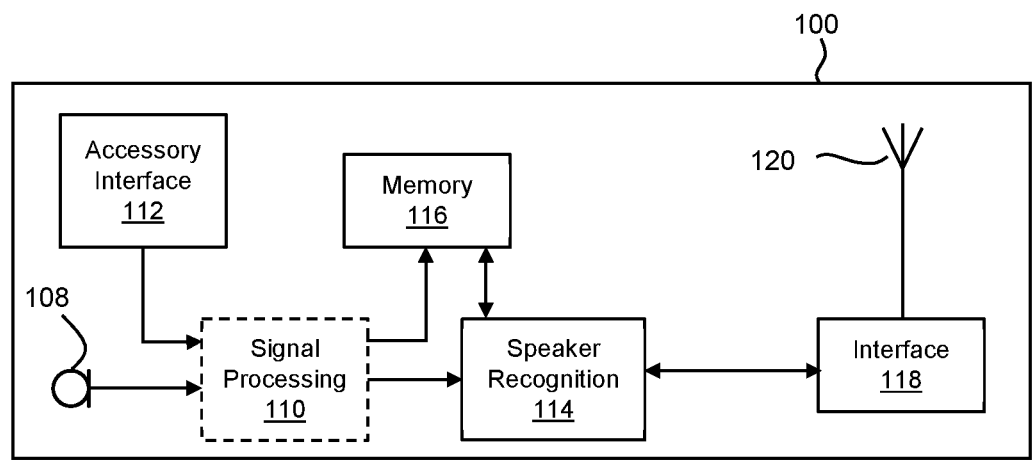

FIGS. 1a and 1b show a device 100 in accordance with one aspect of the invention. FIG. 1a illustrates a perspective view of the device, and FIG. 1b illustrates some of the typical functional modules within such a device, which in this example is a portable device, such as a mobile telephone or tablet computer or the like. It will be appreciated, however, that the device may be any type of device where speaker recognition may be of use. Such devices may include, without limitation, devices such as a tablet computer, a games console, a remote control device, a domestic appliance (which shall be taken to include domestic control systems such as a domestic temperature or lighting control system), a toy, a machine such as a robot, or the like. It will also be appreciated that the device 100, especially when implemented as a smartphone or tablet computer or the like, may, by suitable software, be used as the control interface for controlling any other further device or system.

The device 100 in this example includes a screen 102 for displaying information to a user, a sound inlet 104 for allowing sound to be detected by a microphone, and a connector 106, such as a jack socket or other port or receptacle, for allowing an accessory to be connected to the device.

In this example, the device 100 includes a microphone 108, which may for example be located close to the sound inlet 104 shown in FIG. 1a. Electronic signals generated by the microphone 108 are passed to a signal processing block 110, which performs initial signal processing of the signals, for example converting analog signals received from the microphone 108 into digital signals.

The device 100 in this example also includes an accessory interface 112 which may for example be located close to the jack socket 106 shown in FIG. 1a. The jack socket 106 and the interface 112 may be suitable for allowing an audio accessory, such as a headset to be connected thereto, and signals received from a microphone on such an accessory may also be passed to the signal processing block 110, which may perform initial signal processing of the signals.

The signal processing block 110 is connected to a speaker recognition module 114. The term "module" shall be used to at least refer to a functional unit, and the functional unit may be implemented at least partly by dedicated hardware components such as custom defined circuitry and/or at least partly be implemented by one or more software processors or appropriate code running on a suitable processor, which may be a general purpose processor or the like. Any circuitry components or software processes forming part of one module may be shared with another module and/or the same processor may implement multiple modules. A particular module may itself comprise component modules.

The speaker recognition module 114 may be configured to implement one or more of the methods of the present disclosure as described herein. The speaker recognition module 114 may be implemented by a suitable processor and may operate on the basis of data and program instructions stored in a memory 116. It will be appreciated that a processor used to implement the speaker recognition module may be a general purpose processor that is provided for a range of tasks and which may be used for a variety of functions, for instance an applications processor of the device 100. In some implementations, however, the speaker recognition module 114 may comprise a processor which is specifically provided for the purposes of speaker recognition and/or the speaker recognition module 114 may include at least some custom or dedicated circuitry.

The speaker recognition module 114, in this example, is connected to an interface 118, which is itself connected to an antenna 120, allowing signals to be transmitted and received over an external network to remote devices.

For speaker recognition, the on-board microphone 108 of the device 100 or a microphone of a connected accessory may therefore generate an audio signal corresponding to the utterances of the present user of the device. Such a microphone signal may be subject to some initial processing by signal processing block 110, e.g. converted to a suitable digital audio signal. Alternatively, the audio signal corresponding to the utterances of the user may be received via some other channel, for instance via antenna 120, say from a microphone which is part of an accessory that communicates with device 100 via some wireless protocol, such as Bluetooth™ or the like. In some embodiments, the audio signals corresponding to utterances of the user may be generated remotely by suitable audio detecting apparatus and transmitted to device 100 via any suitable communication channel, whether wired or wireless.

In some implementations, the device 100 may receive the audio signals corresponding to utterances of the user in a suitable form, without needing to perform any prior signal detection or signal processing. In such implementations, the device may not require signal processing block 110, or microphone 108 which may therefore be omitted. In some implementations, the device 100 may be configured to receive audio signals via a subset of microphone 108, accessory interface 112, or wireless interface 118 or even via some other input route, in which case the redundant elements may be omitted, or at least not coupled to speaker recognition module 114.

Figure 2:
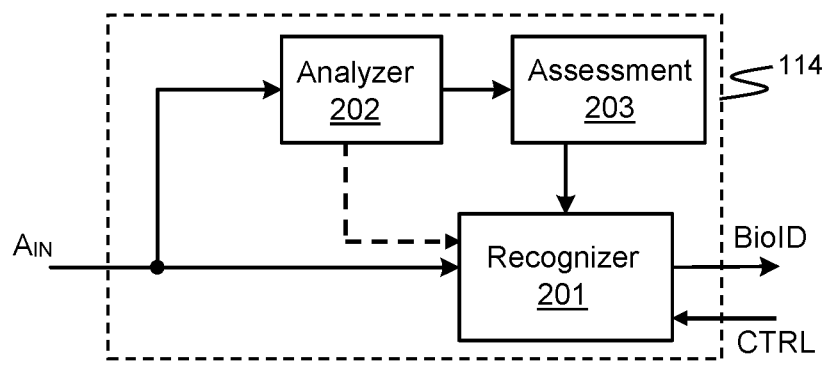
FIG. 2 illustrates an embodiment of a speaker recognition system.

FIG. 2 illustrates one embodiment of a speaker recognition module 114.

The speaker recognition module 114 has an input for receiving audio data in the form of an audio input signal $A_{IN}$ corresponding to speech sounds uttered by a user. As used herein, speech sounds at least refers to any sounds that may be vocalized or uttered by a user during speech. As used herein, speech at least relates to a user producing distinct deliberate sounds, but this does not necessarily need to have any specific content or meaning and shall be taken to include a user making vocal sounds such as a cough. In some speaker recognition applications, a user may recite nonsense words or phrases or utter speech sounds that do not correspond to specific known words. Speech shall be taken to at least include uttering the speech sounds in any fashion, i.e. including singing.

As described above, the audio input signal $A_{IN}$ may be received from an onboard microphone 108 of the host device or a microphone of a peripheral apparatus connected to the device via an interface 112 or communicated from a remote device. The audio input signal $A_{IN}$ may have been subjected to some initial processing, which may for instance have detected that the audio signal corresponds to speech of a user.

The audio input signal may be provided to a recognizer 201 which may process the audio data for speaker recognition purposes. Depending on a mode of operation, which may be controlled by a received control signal CTRL, the recognizer 201 may process the received audio data to determine characteristics of the audio signal that can be used for speaker recognition. This determination may be part of an enrollment process for enrolling a new user or may be part of an identification and/or verification purpose for determining or verifying the identity of an enrolled user. In some instances, speaker recognition for identification may be enabled and performed for substantially any audio data received corresponding to speech of a user. For example, if two or more users are registered as user of a device, the identity of the present user may be determined or confirmed any time a spoken command is identified so at least some aspects of device operation can be tailored according to a profile for that user, although in some embodiments, it may be sufficient to apply speaker recognition to a first spoken command and assume that the user does not change for a certain time and/or as long as the device is continuously used. In some embodiments, however, speaker recognition for identification/verification may only be required at certain times, for instance as authentication step associated with certain actions that are highlighted as requiring authenticated permission and thus speaker recognition may only be performed following some suitable control signal.

The recognizer 201 may operate in a known way by analyzing the audio data $A_{IN}$ in a sequence of frames as will be described in more detail below and will be readily understood by one skilled in the art.

In the embodiment of FIG. 2, the speaker recognition module comprises an analyzer 202 and an assessment module 203. The analyzer 202 is configured to analyze each of a sequence of frames of the audio data which correspond to speech sounds uttered by a user to determine at least one characteristic of the speech sound of that frame. The analyzer 202 may, for instance, determine whether the speech sound corresponds to a specific predetermined speech sound or is within a particular predefined class of speech sounds. For instance, the analyzer 202 may try to determine the speech sound as being a specific sound, e.g. a specific phoneme or senone or the like, or identify the speech sound as being in a particular class of sounds, for instance a predefined class of phonemes, e.g. a vowel, nasal, plosive, sibilant etc. or being a voiced or unvoiced sound. The analyzer 202 delivers an indication of the characteristic(s) of the speech sound for a frame to an assessment module. The assessment module 203 deduces from the characteristics of the speech sound, e.g. the identity of the phoneme, how likely it is that the present frame would be useful for speaker recognition, e.g. whether it is likely to contribute significantly to the discrimination of the user from other users. The assessment module 203 therefore determines, based on the determined at least one characteristic of the speech sound, a contribution indicator of the extent to which that frame of audio data should be used for speaker recognition processing.

Speaker recognition is concerned with determining the identity of a speaker and thus is concerned with determining whether a given sample of speech corresponds to a known user based on various characteristics of the speech. It has been appreciated however that some speech sounds may be more characteristic of a speaker than others. In other words, some speech sounds may be better for discriminating whether or not the utterance was made by a particular user than other speech sounds.

For example, at least in some operating conditions, speech sounds that involve relatively strong resonances in the vocal tract of a user, e.g. nasals or vowels or voiced speech, may provide a better degree of discrimination than speech sounds, such as plosives or unvoiced speech that do not excite such resonances. The vocal tract of a human generally includes the pharynx, the oral cavity, and the nasal cavity. Sounds which involve resonances of the vocal tract will depend, at least partly on the physical dimensions of these cavities and thus on a physiological characteristic of an individual. The vocal tract of an individual user will likely be physiologically unique and thus such resonances can provide useful information for discriminating between different speakers. By contrast, speech sounds, such as plosives for example, which may not include any strong resonance, may contain less useful information for speaker identification. In fact in some operating conditions, such speech sounds may actually be detrimental for speaker recognition.

Sounds may also be categorized as voiced or unvoiced sounds, or voiced or unvoiced speech. Voiced sounds are those associated with vibration of the vocal cords and for instance be articulated using the vocal cords. Unvoiced sounds do not tend to involve vibration of the vocal cords. Voiced sounds thus excite the vocal tract and tend to have some structure in the sound and have well defined formants. Voiced sounds or voiced speech includes vowels and nasals. Unvoiced sounds do not significantly excite the vocal tract and tend to have a more random structure in the sound. Voiced speech tends generally to have better SNR than unvoiced speech and may, in at least some environments, provide good discrimination for speaker recognition.

The speaker recognition module 114 illustrated in FIG. 2 thus determines some information about a characteristic of the speech sound of a particular frame of the audio data and based on the characteristic, which may be the type of phoneme for instance or whether the sound is voiced or unvoiced, determines how useful the present frame would be for speaker recognition, and provides an appropriate contribution indicator. The contribution indicator may indicate the extent to which that frame should be used in speaker recognition processing by the recognizer 201. The speaker recognition processing may comprise speaker verification, in which case the recognizer 201 may use the contribution indicator for each frame to determine how to process the relevant frames of audio data to determine whether the speech signal is likely to have been spoken by one of one or more pre-enrolled users. Alternatively in an enrollment mode, the speaker recognition processing may comprise speaker enrollment, for instance processing the relevant frames of audio data, based on the contribution indicator for each frame, to contribute to an authorized speaker model for the currently enrolling user.

In some embodiments, the analyzer 202 may extract information regarding the exact individual phoneme for a given frame of data or, in some embodiments, it may be sufficient only to identify the class of phoneme, e.g. vowel or plosive or sibilant etc. or whether the sound is voiced or unvoiced. In some embodiments, the characteristics of the speech sound to which a frame relates may additionally or alternatively comprise information regarding formants or other indicators such as senones in the speech sound. As one skilled in the art will appreciate, a formant is a concentration of acoustic energy in a speech sound around a particular frequency and is typically related to a resonance of the vocal tract. The analyzer may for instance extract information regarding the dominant format peaks and/or nulls to give an indication of the nature of the current phoneme. As will also be understood by one skilled in the art of continuous speech, a particular sound, e.g. phoneme, may be influenced by the sounds preceding and following it in speech. Triphones may be identified based on the context of the phone and senones are parts of a sound that may be used as a detector for a start of a triphones.

In some embodiments, the assessment module may, in addition to receiving at least one characteristic of the speech sound for the current frame, also receive other information used to determine the contribution indicator for that frame. Such ancillary information may comprise an indication of the acoustic environment in which the speech sound was uttered, for instance the background noise level.

Figure 3:
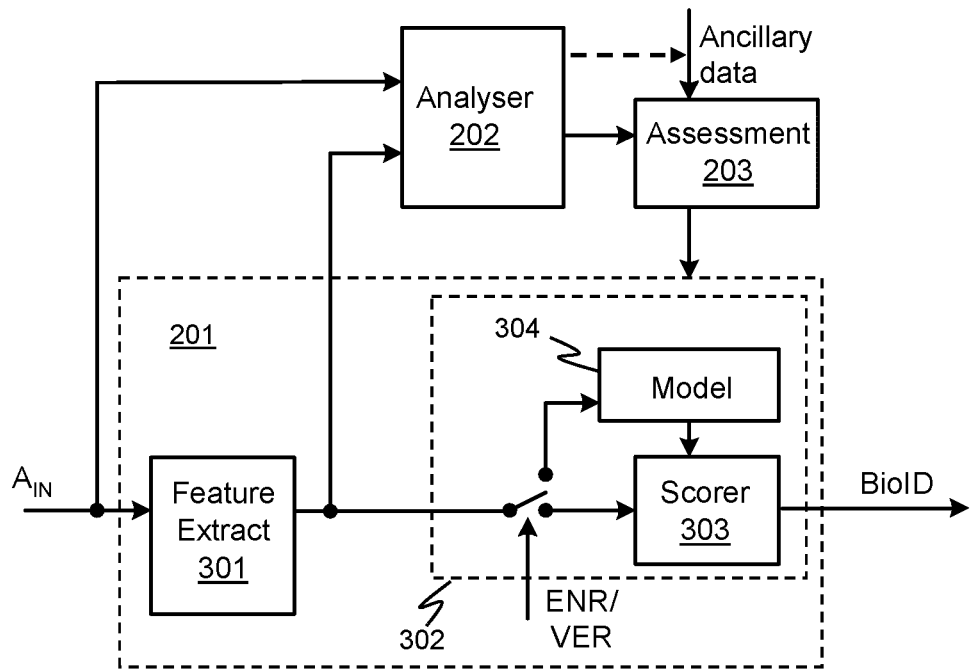
FIG. 3 illustrates a further example of a speaker recognition apparatus.

FIG. 3 illustrates an embodiment in more detail in which the assessment module may determine a contribution indicator for a frame of the audio data using such ancillary information.

FIG. 3 illustrates that the speaker recognition processing may be performed in two parts, and the recognizer 201 may comprise a front-end feature extract module 301 and back-end processing module 302. In the feature extract module 301, the speech signal may typically be processed to reduce its dimensionality while maintaining the information desired for speaker extraction by extracting parameters or features indicative of the speech, for example well-known MFCC (Mel Frequency Cepstral Coefficients), or parameters for an LPC (Linear Predictive Coding) model, or TESPAR (Time Encoding Signal Processing and Recognition) parameters. The Back End processing module 302 receives these parameters and, for speaker identification/verification, a scorer 303 may compare such features against parameters from a model 304 for one or more previously registered users. In some implementations the features may also be compared against parameters from a generalized model or a body of speakers, e.g. a UBM representing the population at large. The scorer 303 may typically derive a score for each frame, representing in some way the probability that the parameters from the received audio input signal correspond to those of a pre-enrolled user rather than someone in the population at large. The scores from many frames may be combined to give a final indication BioID as to whether the user corresponds to one of the pre-enrolled users. Depending on the mode of operation, the indication BioID may indicate which of a number of registered users is likely to be the current user, possibly with a confidence level based on the final combined score or may simply indicate whether or not the current user is verified as a particular pre-registered user above some confidence level. The indication BioID may be provided to some other part of the device such as an applications processor.

The speaker model for a given user may be determined during an enrollment mode of operation. During the enrollment mode of operation, audio data corresponding to speech sounds uttered by a user may be received and features extracted by the feature extract module 301 as discussed above. These features may be fed in enrollment mode directly to the speaker model 304 and may be combined with previous feature data using known techniques to determine and/or store the relevant parameters for the model for that user.

In some instances a generalised speaker model, such as a Universal Background Model (UBM), could be generated or updated during a UBM mode of operation. This mode of operation may be similar to user enrolment except the audio data is taken from a large corpus of speakers representative of the population at large (or possibly separate corpuses for different genders or nationalities or languages are used). Audio data corresponding to speech sounds uttered by each speaker may be received and features extracted by the feature extract module 301 as discussed above. These features may be fed in model generation mode directly to a UBM model and may be combined with previous feature data from that speaker and feature data from other speakers using known techniques to determine and/or store parameters for a UBM for that corpus of speakers. It will be understood by one skilled in the art that generating a useful UBM requires input from a large number of speakers, so this process may typically be performed in a controlled way, e.g. using a representative apparatus, to generate a master model that can then be replicated and used in a number of different products, e.g. installed on the product during manufacture or initialisation or later download. A UBM may also be generated by supplying the corpus audio data to a simulation model of the apparatus.

In the embodiment of FIG. 3, the analyzer 202 may use at least some of the parameters which are extracted by the feature extract module 301 for speaker recognition purposes, rather than generate similar parameters in parallel. In some embodiments, the parameters extracted by the feature extract module 301 for the purposes of speaker recognition processing by the back-end module 302, for example MFCC coefficients and the like, may be sufficient for the analyzer to determine suitable characteristics about the speech sound of the frame to provide an indication which is sufficient in turn for the assessment module 203 to be able to determine the contribution indicator for the present frame. In other words the analyzer may not need to derive additional parameters from the audio signal, and thus may not need to receive the audio signal itself, although there may be some processing of the extracted parameters, for instance the parameters may be combined or compared with templates or otherwise processed by the analyzer 202 to determine the at least one characteristic, for example an indication of a class of phoneme, which is sufficient in turn for the assessment module 203 to be able to determine the contribution indicator for the present frame. In other embodiments, analyzer 202 may process the incoming audio data representing speech sounds to produce extracted parameters or features in addition or instead of those extracted by feature extract module 301, i.e. those parameters or features extracted for use by scorer 303 or model 304. In further embodiments, the feature parameters derived by feature extract module 301 may also be adequate for use directly by assessment module 203, and thus feature extract module 301 may provide the functionality of the analyzer 202 for providing characteristics of the speech sound of the frame to the assessment module 203.

In some embodiments there may also be a speech recognition module (not separately illustrated) for determining the content of spoken audio. In some embodiments, at least some of the functionality of the speaker recognition module 114 may be shared with or implemented by such a speech recognition module. For instance, a frame analyzer for speech recognition may determine information regarding the specific phoneme to which a particular speech sound corresponds.

A speech sound, such as a plosive or an unvoiced sound, may exhibit less variation (at population level) in the parameters useful for speaker recognition between different speakers than a speech sound that excites a strong resonance of the vocal tract of the speaker, such as a vowel or a nasal or a voiced sound. That is if each of a significant number of individuals were to utter some speech sounds then the plosive speech sounds would, in general, exhibit less variation, when considering the whole population, than the nasal speech sounds or vowel speech sounds and thus would be less likely to discriminate between members of that population.

Thus, any score derived from a frame of audio data comprising a plosive may be unreliable. In conventional speaker recognition, as described above, the scores for multiple frames of audio data corresponding to speech of a user are combined to give an overall confidence level or effectively an indication as to whether or not the speaker is a particular registered user. Frames of audio data that correspond to plosive speech sounds can result in very variable confidence scores, even for the correct speaker, which may impact the overall score derived by combining with scores from other frames comprising more distinctive phonemes, resulting in an unacceptably high false rejection rate (FRR).

Thus, on receipt of an indication that the current frame comprises a plosive phoneme, the assessment module may generate a contribution indicator indicating that the relevant frame is not useful for the speaker recognition processing or at least the frame score should be weighted lower than scores from other frames.

As mentioned previously as well as receiving a characteristic of the speech sound of the current frame as determined by the analyzer 202, the assessment module 203 may receive other ancillary data to assist its decision with regard to the contribution indicator for a frame of audio data. Such ancillary data may comprise other information that indicates whether the speech sound of the current frame is likely to be useful for speaker recognition processing. The ancillary data could be related to the operating conditions of the device for speaker recognition. For instance, data regarding the acoustic conditions in which the speech sound was uttered by the user may be useful, such as information regarding background noise.

Noise in the audio signal used for speaker recognition can greatly impact the reliability of the speaker recognition processing and further that the impact of noise may be different for different speech sounds.

Figure 4:
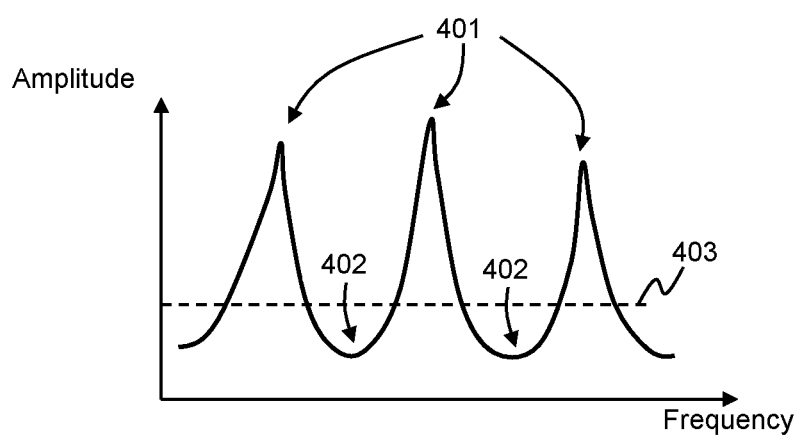
FIG. 4 illustrates the principles of formants in audio data corresponding to a speech sound.

Speech sounds that result in relatively strong resonances in the vocal tract of a user may, in general, allow for better discrimination between users (at population level) as the resonance will depend on physiological properties of a user. In general such sound may be voiced speech. Two such speech sounds are vowels and nasals. Such speech sounds may produce a spectrum for the speech sound which exhibits strong formants, i.e. a concentration of acoustic energy in a speech sound around a particular frequency. FIG. 4 illustrates a hypothetical spectrum of a speech sound to illustrate the principles of formants. FIG. 4 shows the envelope of amplitude, i.e. acoustic energy or sound pressure level of the speech sound, against frequency and in this hypothetical example, there are three clear formants, which may for instance be related to resonances of the pharynx, oral cavity and nasal cavity with formant peaks 401 and formant nulls 402. In reality, for a given speech sound, there may be clear peaks but less clearly defined nulls or vice-versa.

Nasals may be useful for discrimination due to a strong resonance in the nasal cavity, which tends to be relatively consistent as the shape of a user's nasal cavity may not vary much over time, whereas a resonance of the oral cavity can depend on the shape of the mouth which is influenced by the preceding and succeeding speech sounds. For nasals, however, the features which may be of most use for comparison with the speaker model is the arrangement of formant nulls, i.e. the frequencies of minima in the spectrum of the speech sound due to anti-resonances. Nasals may therefore be usefully utilized for speaker recognition purposes, provided that the relevant formant nulls can be sufficiently identified. In low noise conditions, the formant nulls may be relatively clear, and thus a nasal speech sound can usefully be utilized for speaker recognition processing with a relatively high confidence. In the presence of noise, however, especially with a background noise spectral density as close to, or higher than, the speech signal density around these nulls, it may be harder to determine the formant nulls accurately and the ability for nasals to usefully contribute to speaker recognition may diminish. For example, in a case where there is a relatively broadband noise spectrum indicated by dotted line 403 it may be difficult to accurately determine the presence or location of formant nulls leading to an increase in FFR and/or FAR.

Vowels also tend to excite relatively strong resonances, but for vowels, the indicators useful for discriminating between different speakers are the formant peaks. The formant peaks of vowel speech sounds may be less strongly discriminative than the formant nulls of nasal speech sounds, but the arrangement of the formant peaks may be determined relatively accurately, even in the presence of relatively significant noise.

The ancillary data may therefore comprise an indication of the noise level of the audio signal corresponding to the speech sounds uttered by the user. The assessment module may vary the contribution indicator for a frame for certain speech sounds or classes of speech sounds based on the indication of noise. For example if there is low noise, the assessment module may generate a first contribution indicator for a nasal speech sound, indicating that the relevant frame is useful for the speaker recognition processing, whereas in the presence of significant noise, the assessment module may generate a second contribution indicator for a nasal speech sound, indicating that the relevant frame is not useful for the speaker recognition processing. In some implementations the contribution indicator for vowel sounds may not vary with noise, or the contribution indicators for nasal speech sounds and vowel speech sounds may be adjusted with noise such that as lower noise levels frames corresponding to nasal speech sounds are preferentially used but at higher noise levels frames corresponding to vowel speech sounds are preferred, at least up to some threshold noise level beyond which the noise may be so high that it is determined that no sufficiently accurate speaker recognition processing can be performed. If the noise is above a certain threshold level, it may not be possible to use any speech sound accurately for speaker recognition and the assessment module may signal that no frames should be used for speaker recognition until the background noise level has reduced.

An indication of noise in the audio signal may be determined by the analyzer. For example in some embodiments, the analyzer may comprise a noise estimation module (not separately illustrated) coupled to the audio signal input. This noise estimation module may for example monitor the signal level in frames where the signal level is low, e.g. apparent silence due to short or longer gaps in speech. In some embodiments, however, an indication of noise may be determined by some other module(s) or component(s) and communicated to the assessment module.

The indication of noise may be an indication of the noise level, either in absolute terms or relative to the signal level for the speech sounds uttered by the user, i.e. an indication of the signal-to-noise ratio. Additionally or alternatively, the indication of noise may comprise an indication of the noise frequency or spectrum. For a relatively significant noise component at a particular frequency, the frequency and/or frequency spread of the noise may be useful to determine whether or not particular speech sounds may or may not be useful for speech recognition processing. In some implementations, the indication of noise may comprise an indication of various categories of noise, for instance noise may be classified as being narrow-band noise, e.g. interference, broadband noise e.g. general noise or multipath noise, e.g. reverberation.

The analyzer and assessment modules are configured to determine a contribution indicator for frames of audio data which do correspond to speech sounds uttered by a user and the contribution indicator is based, at least partly, on a determined characteristic of the speech sound of the relevant frame. In some speaker recognition systems, there may be analysis to identify frames of audio data that do not correspond to speech sounds and thus just represent noise and such frames may be eliminated from further speaker recognition processing—this is different to the methods of the present disclosure, however, where different contribution indicators may be determined for different frames of audio data that are both identified as corresponding to speech sounds.

It will be appreciated, however, that the characteristics of the speech sound may indicate that a particular frame of audio data does not correspond to a sound that form part of normal speech, for instance a cough sound or the like. In some embodiments, such sounds may not be of interest for speaker recognition and thus the contribution indicator for such frames may indicate that the relevant frame is not to be used for speaker recognition. In some embodiments, however, a sound, such as a cough, may actually be useful for speaker recognition as it may excite strong resonances of the vocal tract of the type of interest, and thus a contribution indicator for such a frame of audio data may indicate that such a frame may be used for speaker recognition. Embodiments of the present invention may therefore determine characteristics of any frame of audio data that corresponds to a vocal sound produced by a user, including speech sounds such as coughs or the like and other speech sounds, and determine a contribution indicator for such frames of data. For example, the assessment module may only select voiced speech at low SNR and use voiced and unvoiced at high SNR.

The assessment module 203 may also comprise some storage for data to assist its decision regarding the contribution indicator, for example the storage of a list of usefulness scores for various phonemes or classes of phonemes versus levels of ambient noise.

The contribution indicator may take various forms (whether or not ancillary data such as noise is also taken into account in determining the contribution indicator). In some embodiments, the contribution indicator may be a flag as to whether or not that particular frame should be used at all for speaker recognition processing. In such embodiments, the assessment module may therefore select the frames which should be used for speaker recognition processing. For identification/verification purposes, the assessment module may therefore select frames that are not to be compared to the user model. This selection may avoid processing frames which are not of interest. In some implementations, however, it may be simpler to compare all frames to the model to determine a score for the frame but to omit such a score from the final combination. For enrollment purposes, the assessment module may select frames that are not to be used to contribute to the user model for the relevant user. Similarly, if used for UBM generation or adaption purposes, the assessment module may select frames that are not to be used to contribute to the UBM model.

In some embodiments, the contribution indicator may comprise a weighting to be applied to the relevant frame in the speaker recognition processing, in which case the contribution indicator may comprise a value in a set range, say between 0 and 1. The weighting may be based on the characteristic of the speech sound and any ancillary data regarding operating conditions of the speaker recognition processing, such as the acoustic environment. The assessment module 203 may, for instance, apply a transfer function for a particular phoneme or class of phonemes between noise level and contribution indicator.

Figure 5:
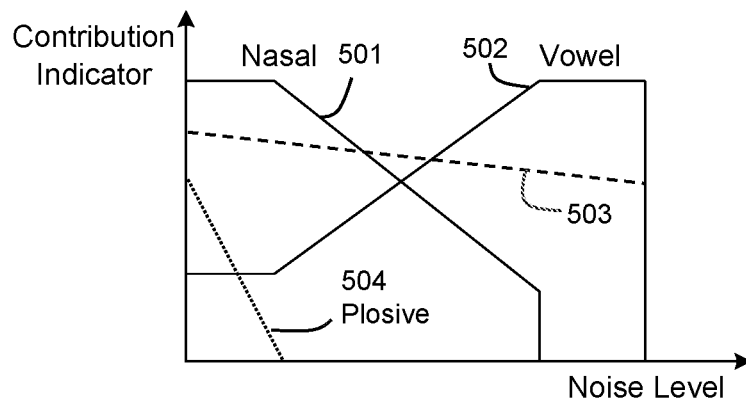
FIG. 5 illustrates example transfer functions of contribution indicator with noise for various classes of speech sound.

FIG. 5 illustrates one example of some transfer functions between contribution factor and determined noise level, whether absolute noise or noise relevant to signal, that could be applied. As mentioned previously, a nasal speech sound may be one of the best speech sound for speaker recognition provided that the formant nulls of the nasal can be identified. A transfer function between contribution indicator and noise for a nasal speech sound may therefore have the form 501 illustrated, starting at some maximum value and possibly maintaining that maximum value up to a first level of noise before reducing to a minimum value of a second level of noise where it is likely that the noise will be too significant to accurately use nasal speech sounds for speaker recognition. While FIG. 5 illustrates a linear reduction between the first and second noise levels, it will of course be appreciated that any desired function may be implemented which may include at least some stepwise reduction or reduction according to some curve. Also, illustrated is an indication 502 of a possible transfer function for a vowel sound. This transfer function may have a value for contribution indicator for low noise levels which is lower than that for nasal speech sounds, such that at low noise levels, greater confidence is attached to frames of audio data corresponding to nasal speech than to vowel speech sounds. As the noise level increases, the contribution indicator for vowel speech sounds may be increased to reflect the fact that vowel speech sounds allow for greater confidence in the presence of noise than other speech sounds. At an upper threshold noise level, the amount of noise may be too great for any speech sounds to be used accurately for speaker recognition, and thus the contribution indicator for vowels may also be set to the minimum value beyond this upper noise threshold. It would be of course appreciated that various other transfer functions could be implemented. For example, the contribution indicator for vowel speech sounds could have a lower value than that for nasal sounds at lower noise levels but reduce more slowly, as indicated by line 503, with increasing noise to reflect that noise may impact accuracy of all speech sounds but less so for vowel sounds. FIG. 5 also illustrates, for example, that for plosive speech sounds, the contribution indicator may rapidly reduce with increasing noise level so that such speech sounds only contribute to the speaker recognition processing at low noise levels.

A weighting indicated by the contribution indicator may be used by the recognizer back-end module 302 in a number of ways, but in general, for speaker identification/verification, the scorer 303 may take the weighting into account when combining the scores from the individual frames. For enrollment, or if appropriate for UBM generation, the model may apply the weighting when combining the parameters from that frame into the model.

There is a variety of other ancillary data that may be useful in assessing whether a particular speech sound may be useful for speaker recognition at that time. Any data that indicates whether a particular speech sound, or class of speech sound or type of formant data will be masked, or distorted in the audio signal or is likely to be particularly relevant or irrelevant for one or more of the registered users may be usefully utilized to determine a contribution indicator for a given frame.

Figure 6:
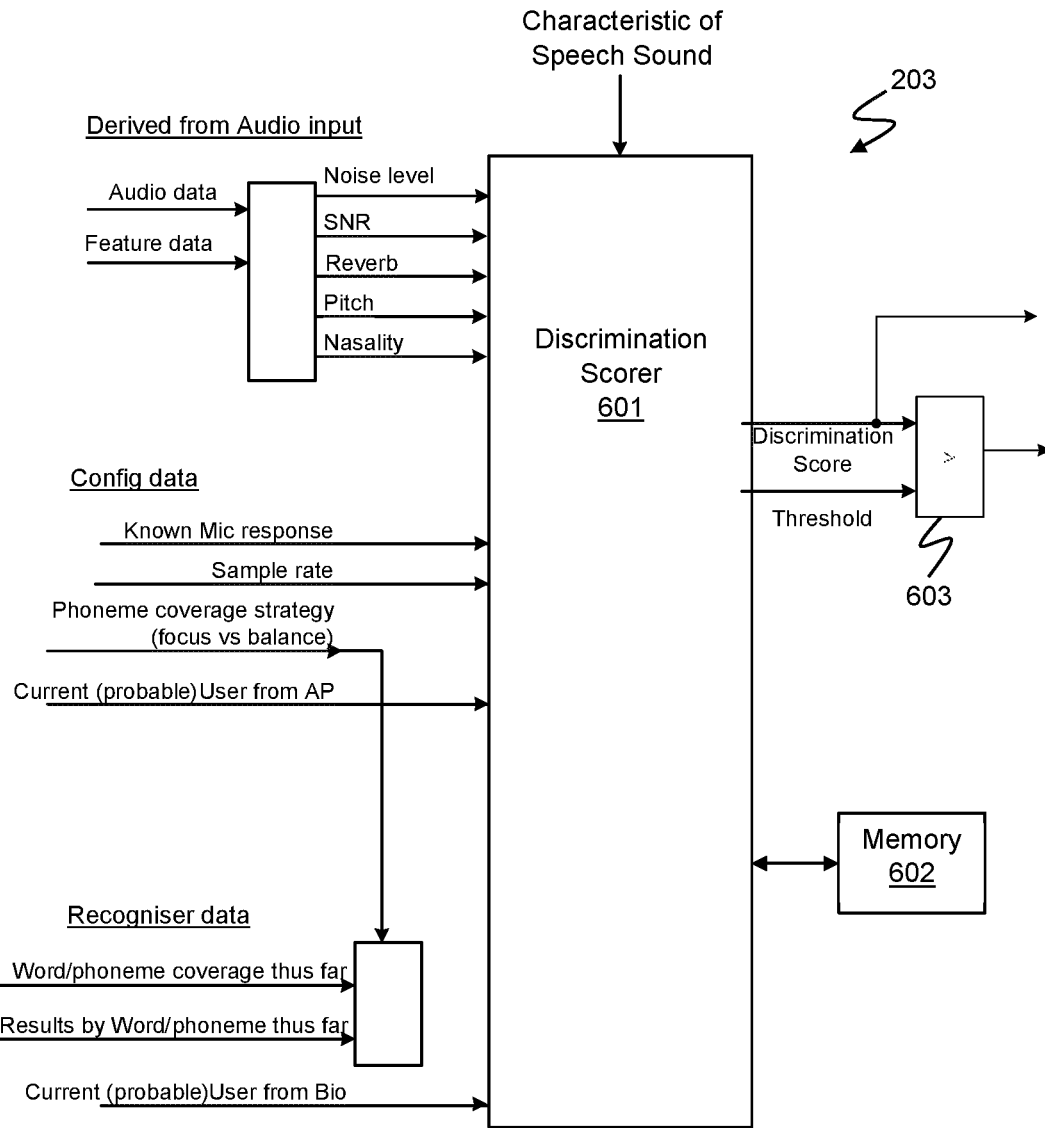
FIG. 6 illustrates an example of an assessment module.

FIG. 6 illustrates generically an assessment module 203 with other ancillary inputs. A discrimination scorer 601 is arranged to receive the at least one characteristic of the speech sound determined by the analyzer 202 for the current frame of audio data and determine a discrimination score indicative of how useful the current frame will be for speaker recognition, i.e. how useful it will be in discriminating between different users and to form a speaker model for enrollment or to verify the identity of the present speaker. The discrimination score is based on the determined characteristic of the speech sound and one or more other inputs as will be explained in more detail below. The discrimination score may determine the score based on scores stored in a look-up table stored in a memory 602 or based on transfer functions stored in the memory 602. The memory 602 may be a dedicated memory for the assessment module 203 or a general purpose memory or memory shared with some other modules of the device 100. In some embodiments, the discrimination score, which may be normalized within a set range, may be output directly as the contribution indicator. In some embodiments, however, the score may be compared to a threshold by thresholder 603 with the output of the thresholder being used as the contribution indicator and indicating as to whether or not the current frame should be used or not in speaker recognition processing.

In some embodiments, various properties of the audio signal may be used to generate the discrimination score for a particular frame.

As mentioned above, the noise in the audio signal may be determined, for example by the analyzer 202 or some other upstream module. Noise may be measured in frames of the audio data which are identified, e.g. by the analyzer 202 or feature extract module 301 or by some other upstream module, as corresponding to voiceless frames of speech. The indication of noise may comprise the noise level, at least in one or more frequency bands and may comprise the absolute level and/or the noise level relative to an indication of signal amplitude, e.g. SNR. The indication of noise may additionally or alternatively include an indication of the spectrum of the noise, especially any interference tones or band-limited components. Likewise, the ancillary data determined from the audio signal may comprise an indication of any detected reverberation. This detection may indicate that some particular likely formants are likely to be difficult to detect which may indicate that certain phonemes may be less useful for speaker recognition purposes in the presence of such noise.

Data obtained from the audio signal may comprise an indication of a speech characteristic derived from speech sounds previously uttered by the user. One such speech characteristic of interest may be the general pitch of the speech sounds in the audio data, i.e. the general pitch of the present speaker. Knowing the pitch of the current speaker again may indicate whether certain formants of certain speech sounds are likely to be of use. For example, for generally higher pitched speakers, certain speech sounds may result in formants that would usually be useful for discrimination being located in high frequency noise for the audio channel or corresponding to some known interference tone. The contribution indicator may therefore be set based on the indication of pitch and any detected noise for the particular speech sound or class of speech sound, for instance based on a look up table or transfer function stored in the memory 602. The pitch of the speaker may be determined by the analyzer 202, either from the audio data itself or from features extracted by the feature extract module 301, or the pitch may be determined by the feature extract module 301.

In some embodiments, the analyzer 202 may analyze the audio data and/or feature data extracted by the feature extract module 301 to determine other characteristics of the general speech of the current speaker. For example, an indication of nasality may be derived indicating the extent to which the speech has a nasal pattern. Especially if none of the registered users have a particularly nasal voice characteristic, this could indicate nasal distortion for instance due to a cold or other condition affecting the nasal cavity. This scenario could prompt the discrimination score to give less weight to nasal speech sounds in such circumstances.

In some embodiments, ancillary information regarding a configuration of the speaker recognition system may be used by the discrimination scorer. Such configuration data may be received, at least partly, from some external component, possibly from a system controller, e.g. an applications processor or the like. For applications where the audio data is captured remotely by some audio capture apparatus, at least some of the configuration data may be received from such remote apparatus. For applications where a particular on-board microphone is always used for generating the audio signal and the audio channel between the microphone and the speaker recognition module is fixed, at least some aspects of the configuration data may be stored in the memory 602.

Such configuration data may comprise information regarding a parameter of an acoustic channel for generating the audio data. The parameter of the acoustic channel may comprise a parameter of the microphone device used to capture the speech sounds from the user or a parameter of the signal path between the microphone and the speaker recognition module or a parameter of the acoustic path from the speaker to the microphone via a sound inlet. The parameter of the acoustic channel may be the parameter of the microphone used to capture the speech sounds, for instance a known response of the microphone and/or knowledge of imperfections associated with the microphone.

The parameter of the microphone may for instance comprise a known microphone resonance. This resonance could accentuate noise in some band and hence make some formant signals less reliable for speaker discrimination. Additionally or alternatively, a parameter of the microphone taken into account by the discrimination scorer may comprise the bandwidth of the microphone. A low bandwidth may again accentuate noise and/or attenuate useful signal in certain bands meaning that certain speech sounds will be of less use for accurate speaker recognition. These parameters may be known for an on-board microphone, and thus a component, such as the applications processor, could signal to the assessment module 203 when the audio signal is generated using the on-board microphone. In some instances, parameters regarding an external microphone could be communicated along with the audio signal.

The parameter of the acoustic channel may comprise the sample rate of a digital part of the acoustic channel. If the sample rate is low, this situation may limit the usable bandwidth/formants and make higher formant signals lesser-value in terms of usefulness for discrimination between users.

The parameters of the acoustic channel may therefore influence the discrimination scores determined for frames of audio data corresponding to at least some speech sounds or classes of speech sound.

In some embodiments, the indication may be an indication of at least one enrolled user profile. As discussed above, users will go through an enrollment process in order to subsequently use speaker recognition for identification/verification. Data stored for each enrolled user may comprise a user profile for that user.

In some instances, the identity of a user of interest for speaker recognition purposes may be known, and thus the relevant user profile which is of most interest for the speaker recognition processing may be known. For instance, consider a device such as a smartphone. There may only be a single registered user for voice control of the device or at least for performing certain actions on the device, and voice verification may be used as a level of authentication for certain functions. For example, if a user issues a voice command which involves invoking a permission which is set for a single registered user, e.g. "show Alice's private diary", the recognizer may be set to verify if the speaker is indeed Alice. Alternatively, due to other context, the possible identity of the user may be known, for instance a user may be logged into a certain level but requires further authentication. In such cases, the identity of the person that is wished to be verified is known, and thus the most relevant user profile is known. The general speech characteristics of that person will also be known as part of the user profile as that user is an enrolled user. It may be that certain speech sounds may be particularly useful for discriminating between that person and someone else who may have acquired the device and/or certain speech sounds may be particularly poor for speaker recognition of that individual, for example if the individual has a speech impediment such as a lisp. The discriminator scorer 601 may therefore set the contribution indicator for a given frame of audio data based on the characteristics of the speech sound and how useful that speech sound is known to be for verifying whether the speaker is that user, i.e. for the relevant user profile.

Even where there is more than one registered user, it may be known which speech sounds or classes of speech sound are likely to be most useful for discriminating between those registered users based on the user profiles, and thus the speech characteristics of the registered users may be used to set appropriate contribution indicators to emphasize the contribution of speech sounds.

In some embodiments, a relevant user profile for the speaker recognition may or may not be known in advance, but as part of the speaker recognition processing, a particular user profile may be identified as being most relevant for further processing. The process of speaker identification or verification may require a certain amount of audio data to be processed before the recognizer decides whether or not the current user corresponds to any particular user. During the speaker identification processing, a likelihood score for each of the registered user may be determined and updated as new audio data is processed. Feedback from the recognizer may indicate the most likely candidate user profile (or a number of the top candidate user profiles), and details regarding the speech characteristics of such a user profile may be used to determine the contribution indicators for the frames of audio data that are most useful for determining whether the current speaker matches that user profile. This feedback may help speed up the overall speaker recognition process as once a likely candidate is identified, emphasis may be given to frames of audio data that most help to verify whether or not the current speaker is that user.

In some embodiments, the degree of matching between a user profile of interest and the current speech data for particular types of speech sounds may be determined. For example, if the speaker recognition processing so far indicates a good fit to a relevant user profile except for nasal sounds, which may possibly be distorted due to the user having a cold, then frames corresponding to nasal speech sounds may be de-emphasized to make a judgement for speaker recognition for that user allowing for possible nasal distortion.

In some embodiments, it may be useful to provide feedback from the recognizer regarding the current results of matching even if a particular user profile of interest is not known. Information regarding the matching results for particular speech sounds or types of speech sounds may indicate which sounds have proven to be useful or not for the speaker recognition processing so far, in the current operating conditions, and thus may indicate which speech sounds should be emphasized or de-emphasized in further processing. For example, if the recognizer results for a particular class of speech sounds is resulting in consistent scores for a given user, then such results may indicate that those speech sounds are useful for discrimination, especially if the scores are relatively high or relatively low. However, if a certain class of speech sounds has scores that vary significantly, from one vocalization to another, then such score variations may indicate that the class of speech sounds actually is not good for discrimination in the current operating conditions.

In some embodiments, the contribution indicator for a frame of audio data may be based on the determined at least one characteristic of the speech sound and also on the number of previous frames of audio data where the determined at least one characteristic was similar. Thus, the contribution indicator for a speech sound or class of speech sound, e.g. a class of phoneme, may vary based on the number of previous instances of the same speech sound or class of speech sound in previous frames of audio data. For instance, if there have already been several instances of a particular speech sound, then it may be beneficial to reduce the contribution indicator for that particular speech sound to allow other speech sounds to contribute. For speaker enrollment, it may be beneficial that the model is based on a range of different speech sounds, and thus de-emphasizing multiple repeated instances of the same speech sound may help provide a more robust model for that user. For speaker identification/verification, it is possible that two different users may say one particular speech sound in a way that is quite similar in terms of the features used for speaker recognition but vary in other speech sounds. In some instances, therefore, increasing the diversity of the speech sounds that contribute to the overall confidence score may improve speaker recognition performance.

The contribution indicator for a given frame of audio data may thus be based on a combination of many diverse inputs or factors. An embodiment may implement one or more different methods of combination. The combination may be implemented as some weighted average or mean of respective component scores arising from the factors, for instance an arithmetic or geometric or root-mean-square average. The combination may be some non-linear combination, for instance any speech sound where the component score for any individual factor is below a respective threshold may be given effectively the lowest contribution indicator. The factors may be allocated respective priorities, and the sieve process started with the highest priority factor and progressing through the factors in decreasing order of priority. For instance the noise level might be considered higher priority than the general pitch of the user's voice.

Figure 7:
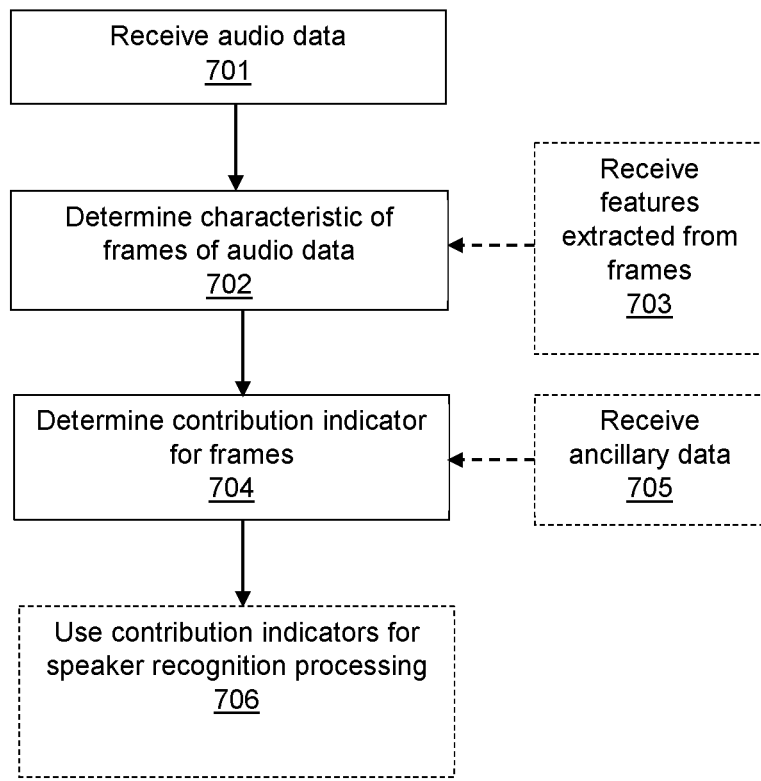
FIG. 7 illustrates a flowchart of a method according to the present disclosure.

FIG. 7 illustrates a flowchart of a method according to the present disclosure. The method involves receiving audio data, as illustrated by box 701, and determining (box 702) characteristics of the frames of the audio data. The characteristics of the frame of audio data may be the identity or class of speech sound, i.e. phoneme, and/or an indication regarding formants in the speech sound. In some embodiments, the method may involve receiving features extracted from the frame of audio data in order to determine the characteristic, as illustrated at box 703. A contribution indicator for each frame is determined (box 704) based on the determined characteristic and, in some embodiments, also on ancillary data received, such as background noise, as illustrated by box 705. In some embodiments, where speaker recognition processing is then carried out, the contribution indication may be used (box 706) in which speaker recognition processing is used to determine the extent to which the individual frames of audio data contribute to the speaker recognition processing.

Embodiments of the present disclosure allow for speaker recognition which may be robust in the presence of noise. The apparatus and methods of the present disclosure may improve the enrollment process for speaker recognition by emphasizing those aspects of speech which are of most use for speaker discrimination and/or de-emphasizing those aspects which are of less use. These apparatus and methods can improve the speaker model for each enrolled user and improve subsequent identification. Also, in some embodiments, if the enrollment occurs with significant noise, the methods and apparatus of the present disclosure can reduce or eliminate the contribution of frames of data that may lead to errors in noise and again improve the validity of the user model. Likewise, during identification/verification, the methods and apparatus of the present disclosure can emphasize those aspects of speech which are of most use for speaker discrimination and/or de-emphasize those aspects which are of less use and/or adjust the use of frames of audio data based on noise so as to improve noise robustness. Using other ancillary data may also focus on speech sounds that are of most use for the likely users to be identified which may improve reliance, e.g. reduce FRR and/or FAR and/or improve speed of decision making. The methods of the present disclosure could also be applied to the formation or adaptation of a model of generalized speakers of a population, e.g. a UBM, and may improve the ability to discriminate a specific speaker from the general population.

The discussion above has referred to frames of the audio data. As used herein, the term frame at least refers to a time segment of audio data. In the digital domain, the frame of audio data may comprise a number of consecutive samples of the audio signal. The duration of each frame may be consistent from frame to frame and may, be predefined. The analyzer 202 may identify the frames based on characteristics of the received audio signal or more simply process the audio data in groups of so many consecutive samples. In some instances, the frames may be defined by the format of the audio data, for instance the particular coding scheme applied by some upstream processing such as signal processing module 110. In some embodiments, however, the frames may potentially vary in duration and may be based at least partly on the audio content, for instance processing of the audio signal to identify segments of the audio data that should be processed together and which may likely correspond to a particular speech sound. In some embodiments, each identifiably distinct speech sound in a speech segment may correspond to just one frame of the audio signal, but in some embodiments, more than one frame of the audio data may correspond to the same speech sound.

The discussion above has also discussed a speaker recognition module as including the recognizer 201 and the assessment module 203 and analyzer 202 (whether or not at least some functionality of the analyzer is provided by the feature extract module 301). In some embodiments, however, the assessment module could be implemented remotely from the recognizer and/or the analyzer. For instance, the recognizer could be implemented on a remote server to provide authentication for access to some service to which lots of different users may want access, whereas the assessment module could be implemented on a local device so information regarding the local acoustic channel may be used in determining the frames of the audio data which are useful for discrimination. In some embodiments, there may be more than one assessment module, for instance a first assessment module may determine a first contribution indicator based on the identity of the phoneme or class of phoneme and known characteristics of the acoustic channel with a second assessment module receiving the information and adjusting the contribution indicator based on information about the user profiles.

The skilled person will thus recognize that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus, such as re-programmable logic gate arrays. Similarly, the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

As used herein the term 'module' shall be used to at least refer to a functional unit or block which may be implemented at least partly by dedicated hardware components, such as custom defined circuitry and/or at least partly be implemented by one or more software processors or appropriate code running on a suitable general purpose processor or the like. A module may itself comprise other modules or functional units. Embodiments of the present disclosure may be arranged as part of an audio processing circuit, for instance an audio circuit which may be provided in a host device. A circuit according to an embodiment of the present disclosure may be implemented as an integrated circuit.

Embodiments may be implemented in a host device, especially a portable and/or battery powered host device such as a mobile telephone, an audio player, a video player, a PDA, a mobile computing platform such as a laptop computer or tablet and/or a games device for example.

Embodiments of the present disclosure may also be implemented wholly or partially in accessories attachable to a host device, for example in active speakers or headsets or the like. Embodiments may be implemented in other forms of device such as a remote controller device, a toy, a machine such as a robot, a home automation controller or suchlike.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. Further embodiments likewise, with the benefit of this disclosure, will be apparent to those having ordinary skill in the art, and such embodiments should be deemed as being encompassed herein.

The invention claimed is:

1. An apparatus for use in biometric speaker recognition, wherein the apparatus is configured to receive digital audio data derived from an audio signal output by a microphone, the apparatus comprising:
   an analyzer for analyzing each frame of a sequence of frames of the digital audio data which correspond to speech sounds uttered by a user to determine at least one characteristic of the speech sound of that frame; and
   an assessment module for determining for each frame of the digital audio data a contribution indicator of the extent to which that frame of the digital audio data should be used for speaker recognition processing based on the determined at least one characteristic of the speech sound, wherein said contribution indicator comprises a weighting to be applied to that frame in the speaker recognition processing, wherein the weighting comprises a value in a set range.

2. The apparatus as claimed in claim 1 comprising a speaker recognition module configured to apply speaker recognition processing to said frames of digital audio data, wherein the speaker recognition module is configured to process the frames of digital audio data according to the contribution indicator for each frame.

3. The apparatus as claimed in claim 1 wherein said contribution indicator comprises a selection of frames of digital audio data not to be used in the speaker recognition processing.

4. The apparatus as claimed in claim 1 where the speaker recognition processing comprises processing the frames of digital audio data for speaker enrollment.

5. The apparatus as claimed in claim 1 where the speaker recognition processing comprises processing the frames of digital audio data for speaker verification.

6. The apparatus as claimed in claim 1 where the speaker recognition processing comprises processing the frames of digital audio data for generation of a generalized model of a population of speakers.

7. The apparatus as claimed in claim 1 wherein the at least one characteristic of the speech sound comprises identification of the speech sound as a specific phoneme or as one of a plurality of predefined classes of phonemes.

8. The apparatus as claimed in claim 7 wherein the contribution indicator varies based on the number of previous instances of the same phoneme or class of phoneme in previous frames of digital audio data.

9. The apparatus as claimed in claim 1 wherein the at least one characteristic of the speech sound comprises identification of the speech sound as a voiced sound or an unvoiced sound.

10. The apparatus as claimed in claim 1 where the at least one characteristic of the speech sound comprises at least one characteristic of one or more formants in the speech sound.

11. The apparatus as claimed in claim 10 wherein said at least one characteristic comprises an indication of at least one formant peak or at least one formant null.

12. The apparatus as claimed in claim 1 wherein the assessment module is configured to receive an indication of acoustic environment in which the speech sound was uttered by the user and wherein the contribution indicator is also based on the indication of acoustic environment.

13. The apparatus as claimed in claim 12 wherein the indication of acoustic environment comprises an indication of noise in the digital audio data.

14. The apparatus as claimed in claim 13 wherein the at least one characteristic of the speech sound comprises identification of the speech sound as one of a plurality of predefined categories of phonemes and wherein, for at least one of said predefined categories of phonemes, the assessment module applies a transfer function between a value of contribution indicator and noise level.

15. The apparatus as claimed in claim 13 wherein the analyzer is configured to analyze the digital audio data to determine said indication of noise.

16. The apparatus as claimed in claim 12 wherein the indication of acoustic environment comprises an indication of reverberation in the digital audio data.

17. The apparatus as claimed in claim 1 wherein the assessment module is configured to receive an indication of a parameter of an acoustic channel for generating the audio data and wherein the contribution indicator is also based on said indication of the parameter of the acoustic channel.

18. The apparatus as claimed in claim 17 wherein the indication of a parameter of the acoustic channel comprises an indication of a parameter of a microphone used to receive the speech sound uttered by a user.

19. The apparatus as claimed in claim 1 wherein the assessment module is configured to receive an indication of a speech characteristic derived from speech sounds previously uttered by the user and wherein the contribution indicator is also based on the indication of the speech characteristic.

20. The apparatus as claimed in claim 19 wherein the indication of the speech characteristic comprises an indication of a pitch of the user or an indication of a nasality of the user.

21. The apparatus as claimed in claim 1 wherein the assessment module is configured to receive an indication of at least one enrolled user profile and wherein the contribution indicator is also based on said indication of the enrolled user profile.

22. The apparatus as claimed in claim 1 wherein the assessment module is configured such that the contribution indicator for a frame of digital audio data is based on the determined at least one characteristic of the speech sound and on the number of previous frames of digital audio data where the determined at least one characteristic was similar.

23. An electronic device comprising an apparatus as claimed in claim 1 wherein the electronic device is at least one of: a portable device; a communication device; a mobile telephone; a computing device; a laptop, notebook or tablet computer; a gaming device; a wearable device; a voice controllable device; an identity verification device; a wearable device; or a domestic appliance.

24. An apparatus for use in biometric speaker recognition, wherein the apparatus is configured to receive digital audio data derived from an audio signal output by a microphone, the apparatus comprising:
a processor configured to implement an assessment module for determining for a sequence of frames of the digital audio data which correspond to speech sounds uttered by a user a contribution indicator of the extent to which a frame of the digital audio data should be used for speaker recognition processing based on at least one characteristic of the speech sound to which the frame relates, wherein said contribution indicator comprises a weighting to be applied to each frame in the speaker recognition processing, wherein the weighting comprises a value in a set range.

25. A method of speaker recognition, comprising:
analyzing each frame of a sequence of frames of digital audio data which correspond to speech sounds uttered by a user to determine at least one characteristic of the speech sound of that frame, wherein the digital audio data is derived from an audio signal output by a microphone; and
determining for each frame of digital audio data a contribution indicator of the extent to which that frame of digital audio data should be used for speaker recognition processing based on the determined at least one characteristic of the speech sound, wherein said contribution indicator comprises a weighting to be applied to the each frame in the speaker recognition processing, wherein the weighting comprises a value in a set range.

26. A non-transitory computer-readable storage medium having machine readable instructions stored thereon that when executed by a processor, cause the processor to perform the method of claim 25.

* * * * *